Figure 1:
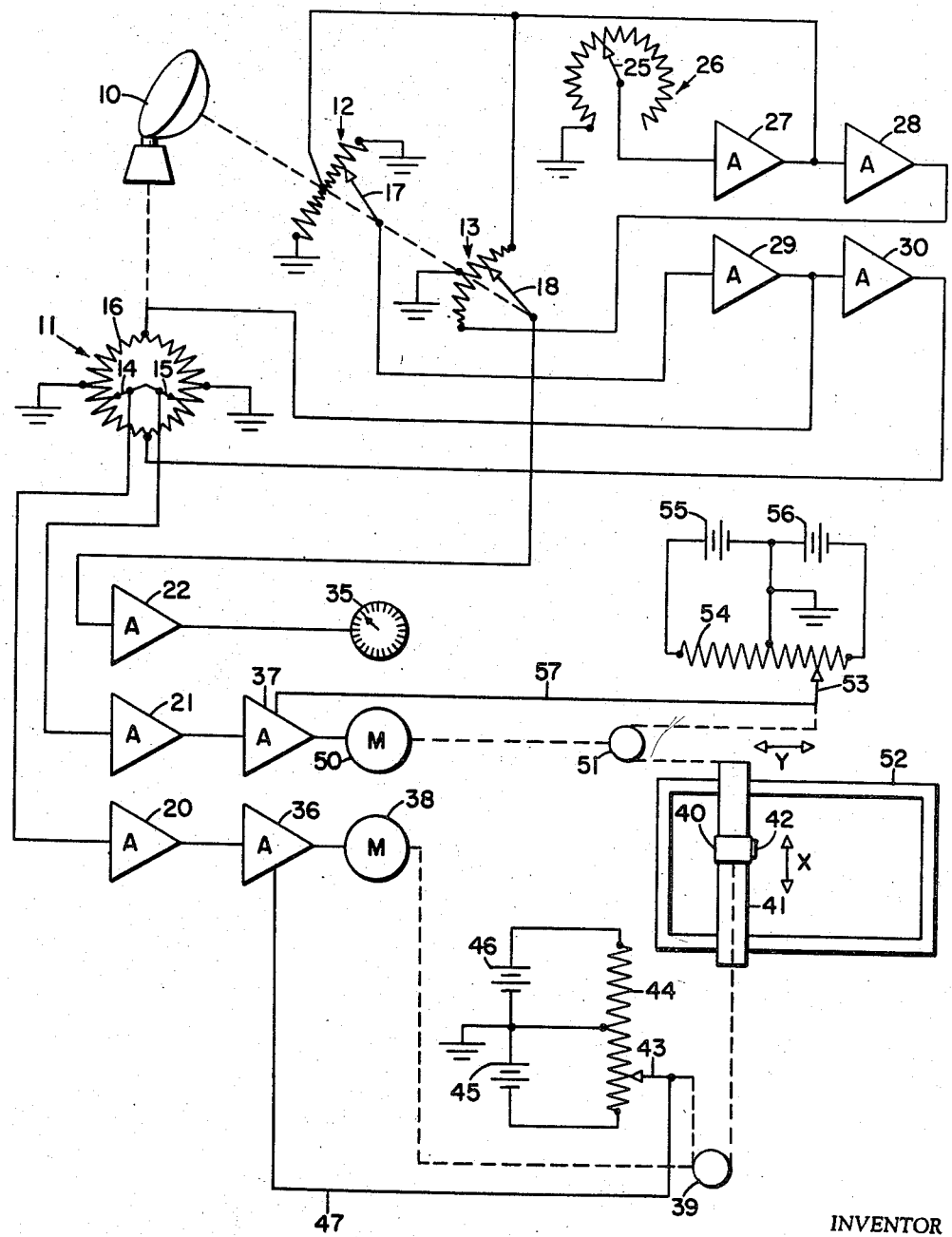

Dec. 20, 1955     H. E. HOLLMANN     2,728,065
AUTOMATIC CONTROL SYSTEM FOR PILOTLESS VEHICLES
Filed July 15, 1954     5 Sheets-Sheet 1

INVENTOR
HANS E. HOLLMANN
BY
ATTORNEY

INVENTOR
HANS E. HOLLMANN

ATTORNEY

Dec. 20, 1955  H. E. HOLLMANN  2,728,065
AUTOMATIC CONTROL SYSTEM FOR PILOTLESS VEHICLES
Filed July 15, 1954  5 Sheets-Sheet 3
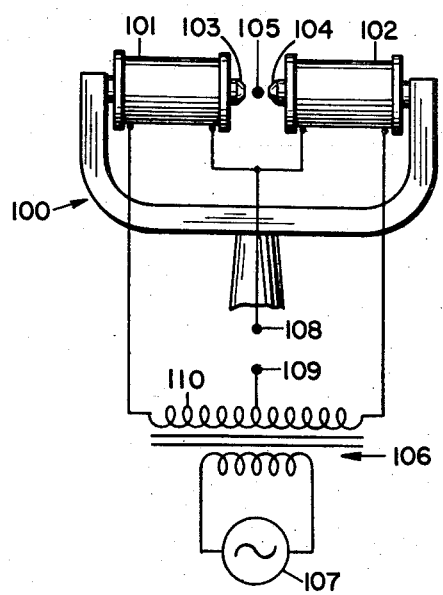
Fig. 3
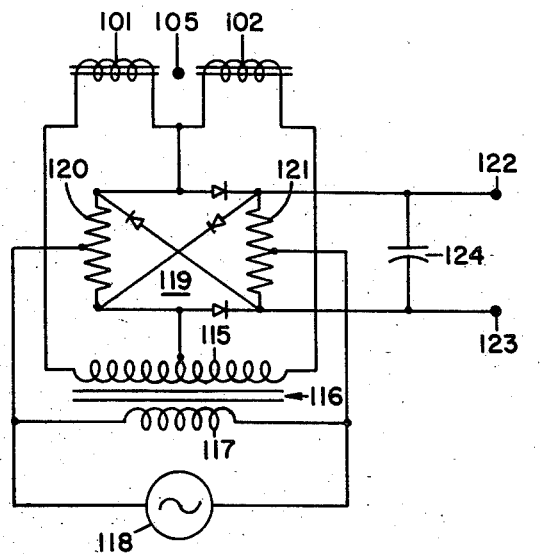
Fig. 4
INVENTOR
HANS E. HOLLMANN
BY 
ATTORNEY Dec. 20, 1955 H. E. HOLLMANN 2,728,065
AUTOMATIC CONTROL SYSTEM FOR PILOTLESS VEHICLES
Filed July 15, 1954 5 Sheets-Sheet 4
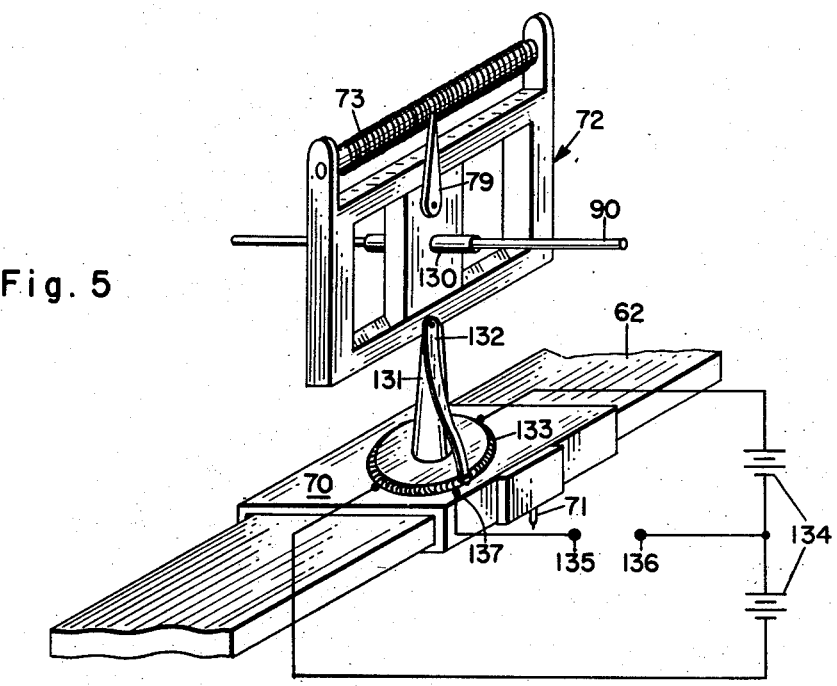
Fig. 5
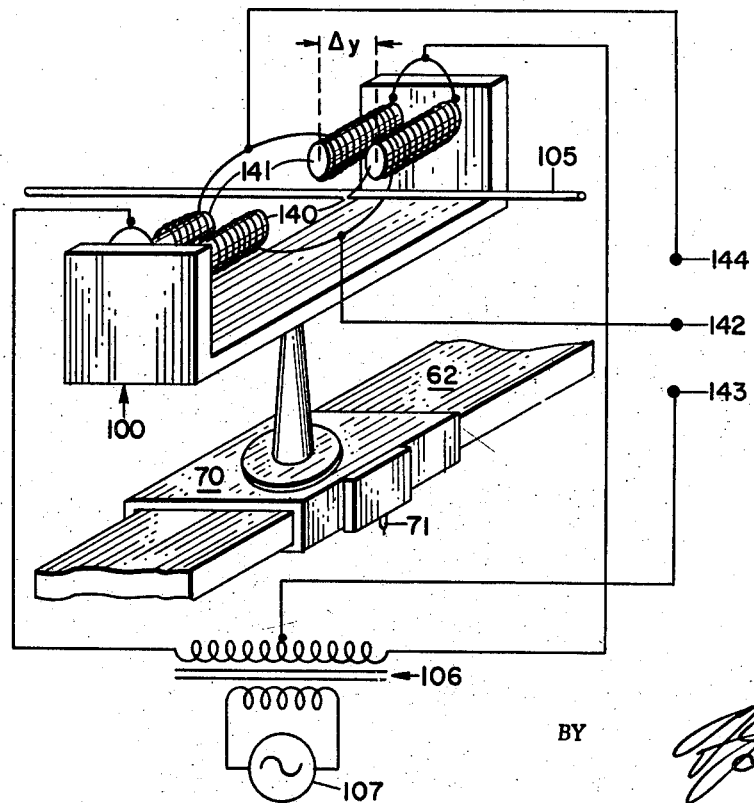
Fig. 6
INVENTOR
HANS E. HOLLMANN
BY 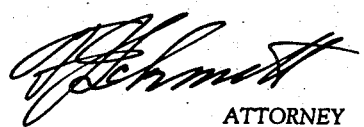
ATTORNEY Dec. 20, 1955  H. E. HOLLMANN  2,728,065
AUTOMATIC CONTROL SYSTEM FOR PILOTLESS VEHICLES
Filed July 15, 1954  5 Sheets-Sheet 5
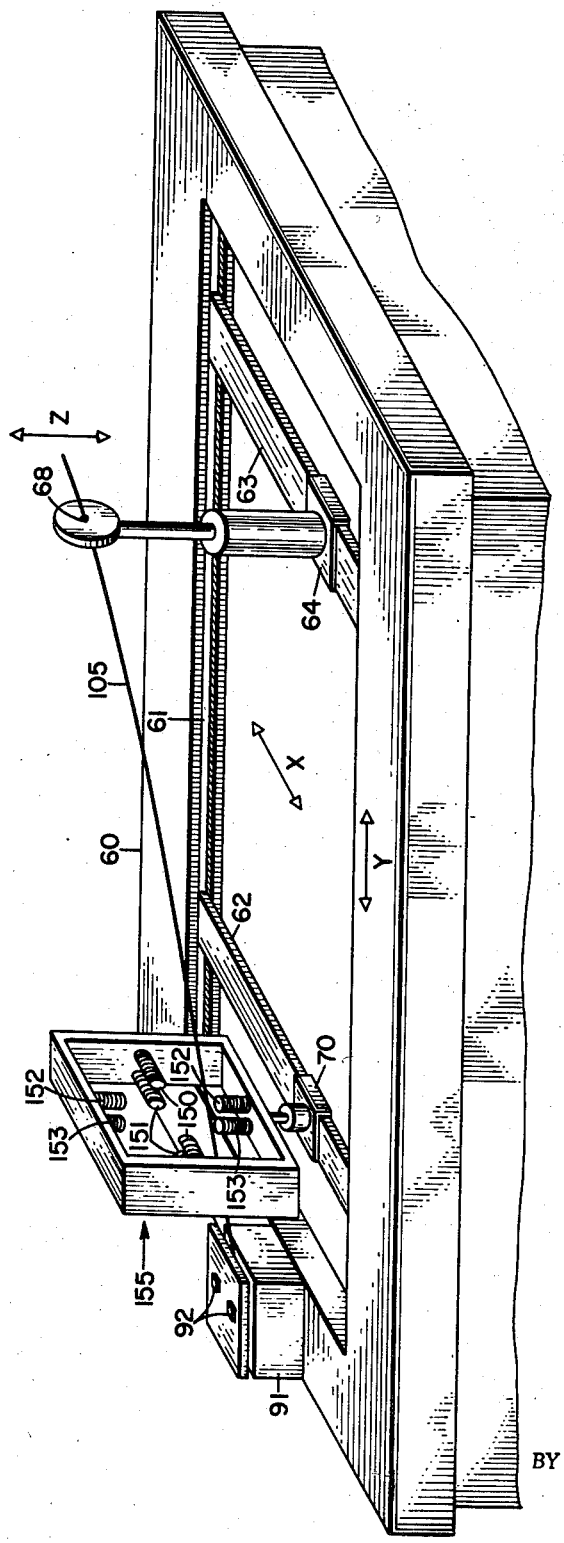
Fig. 7
INVENTOR
HANS E. HOLLMANN
BY
ATTORNEY

United States Patent Office

2,728,065
Patented Dec. 20, 1955

2,728,065

AUTOMATIC CONTROL SYSTEM FOR PILOTLESS VEHICLES

Hans E. Hollmann, Oxnard, Calif.

Application July 15, 1954, Serial No. 443,721

9 Claims. (Cl. 340—24)

(Granted under Title 35, U. S. Code (1952), sec. 266)

The invention described herein may be manufactured and used by or for the Government of the United States of America for governmental purposes without the payment of any royalties thereon or therefor.

The present invention relates to an automatic control system for pilotless vehicles and more particularly to such a system utilizing an elongated resilient member which simulates on a reduced scale the desired flight path of a remotely controlled vehicle, and also employing a sensing means which moves relative to the course simulator in accordance with the actual movements of the pilotless vehicle.

Although the invention system is adapted to remotely control the movements of any pilotless vehicle, it is especially adapted to control a guided missile in its flight from the launching position to a stationary or moving target. In missile control systems, it is necessary to provide an electronic or visual tracking means for tracking both the target and the missile in order that their relative positions may be determined at all times. The remote control means of such systems transmit radio signals to the missile which control its flight until the missile ultimately strikes the target. In order to properly control the missile's flight, the radio signals must be given by a skilled operator or by extremely complicated computers which predict the future position of a moving target according to its present flight path and behavior and then compute the desired future flight path of the missile so as to intersect the target at a predicted position. Since the accuracy of the tracking means and the remote control system decreases as the missile moves away from the control point, a homing device and/or a proximity fuse is usually provided to guide the missile during the final phase of flight and detonate it in the immediate vicinity of the target.

It is obviously desirable to eliminate the necessity of providing an operator to manually supply control signals to the system with the attendant possibility of human error in such operation. Accordingly, fully automatic systems have been developed, but known systems of this type are extremely bulky, expensive, complicated and unreliable.

The present invention is a fully automatic system wherein a target simulator moves on a reduced scale in accordance with the movements of an actual target. An elongated resilient member serves as a course simulator and has one end clamped to a member which represents the launching position of the missile. A member is connected to the target simulator means and engages an intermediate portion of the course simulator which is thereby adapted to be deformed and assume a configuration which automatically simulates on a reduced scale the desired flight path of the missile in order to strike the target. A vehicle simulator means moves in accordance with the flight of the missile and includes an electrical sensing means. When the missile is traveling along the desired flight path, the sensing means is in a predetermined zero or center position relative to the course simulator means and no control signals are produced. When the missile deviates from the desired course, the sensing means will correspondingly deviate from its center position relative to the course simulator thereby producing control signals which by remote control direct the missile back to the desired flight path. Accordingly, no operator or complex computers are required in the invention system thereby considerably reducing the complexity and cost of construction of the system and the possibility of error in the operation thereof.

An object of the present invention is the provision of a new and novel automatic control system for pilotless vehicles which eliminates the necessity of providing complex computers or skilled operators in the operation thereof.

Another object is to provide a new and novel automatic control system which automatically determines and simulates the optimum flight path of a missile in order to strike a stationary or moving target.

A further object of the invention is the provision of a new and novel automatic control system which is simple and inexpensive in construction, yet accurate and reliable in operation.

Figure 2:
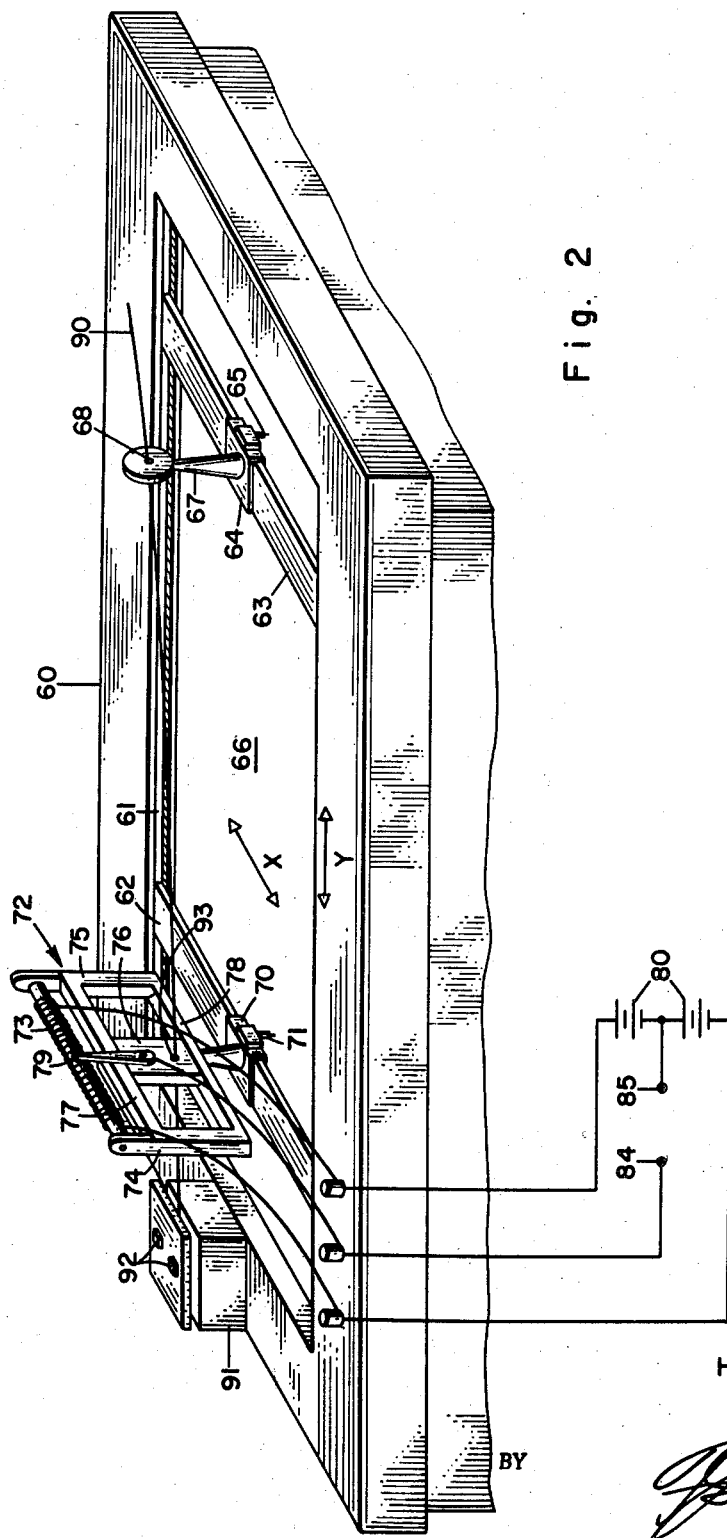

Other objects and many of the attendant advantages of this invention will be readily appreciated as the same becomes better understood by reference to the following detailed description when considered in connection with the accompanying drawings wherein:

Fig. 1 is a schematic block diagram of a conventional automatic radar tracker which plots the ground position of a missile or a target, Fig. 2 shows an isometric view of a control system according to the present invention wherein the target and missile simulators each move in two directions, Fig. 3 is a schematic diagram of a variable reluctance sensing means and associated bridge circuit utilized in the invention system, Fig. 4 shows a sensing means and bridge circuit similar to Fig. 3 employing synchronous rectification, Fig. 5 illustrates a vehicle simulator including a sensing means for producing directional as well as lateral signals, Fig. 6 shows a vehicle simulator employing a reluctance type sensing means giving directional signals, and Fig. 7 is a somewhat schematic view of a control system according to the present invention wherein both the target simulator and the vehicle simulator are adapted to move in three directions.

Referring now to the drawings wherein like reference characters designate like or corresponding parts throughout the several views, there is shown in Fig. 1 a simplified block diagram of a conventional automatic radar tracker system which is an electromechanical device for automatically computing and recording the position of a target or missile. For the purpose of illustration, a single radar is illustrated and the tracking table operates only in the horizontal or X—Y directions while the altitude of the target is recorded separately.

Information is obtained in electrical form from the radar antenna and is converted by the components of the system into the necessary mechanical motion for obtaining recordable plots from the radar signals. The cross arms and plotting pen of the tracker table move so as to accurately plot the momentary ground position of the target on a map or other suitable means at a proper scale factor.

The radar antenna 10 produces electrical signals in polar coordinates which, by means of three ganged potentiometers, viz. the azimuth potentiometer 11 and the elevation potentiometers 12 and 13 are converted into rectangular or X—Y coordinates. In order to accomplish this conversion, each of potentiometers is nonlinear.

The azimuth tracking mechanism of the radar by means of a suitable conventional selsyn system positions the shaft of potentiometer 11 and the contacts 14 and 15 connected thereto in accordance with the azimuth angle of the radar antenna. Contacts 14 and 15 engage the resistance wire 16 on the potentiometer, wire 16 being so wound that one of the contacts taps a voltage equal to the input voltage times the sine of the azimuth angle thus indicating the X component while the other contact indicates the Y component which is proportional to the cosine of the azimuth angle.

The elevation tracking mechanism operates in a similar manner, the elevation mechanism of the radar positioning by means of a suitable conventional selsyn system the shafts and associated brushes 17 and 18 of the elevation potentiometers in accordance with the elevation angle of the radar antenna. The elevation potentiometers 12 and 13 are so wound that contact 18 taps a voltage proportional to the sine of the elevation angle and thus proportional to the altitude of the target, and brush 17 taps a voltage proportional to the cosine of the elevation angle and thus proportional to the ground range. The output voltage of contacts 14, 15 and 18 are respectively connected to the input of D. C. amplifiers 20, 21 and 22 which are so designed as to provide for insulation, phasing, leveling out of erroneous radar fluctuations, scale factors, parallax, etc.

The range tracker mechanism of the radar also positions the contact 25 of the range potentiometer 26 in such a manner that the tapped voltage is proportional to the slant range of the target. The tapped voltage output of contact 25 is connected to the input of the D. C. amplifier 27 and the output of amplifier 27 is connected to one side of the center grounded elevation potentiometer 13 and to the center point of potentiometer 12. The output of amplifier 27 is also connected to the input of amplifier 28 which produces a negative copy of the slant range signal, the output of amplifier 28 being connected to the other side of elevation potentiometer 13.

In a like manner, contact 17 of elevation potentiometer 12 is connected with a similar amplifier net work 29 and 30 which is connected to and provides a supply voltage for the azimuth potentiometer 11. In this manner, the D. C. voltages across the azimuth potentiometer 11 and both elevation potentiometers 12 and 13 are related to the slant range so that the output voltages of amplifiers 20, 21 and 22, respectively, indicate the east-west or X position, the north-south or Y position, and the altitude of the target or missile.

The output of amplifier 22 is connected to a suitable recording instrument 35 which indicates the altitude of the target. The outputs of amplifiers 20 and 21 are connected respectively to the inputs of servo amplifiers 36 and 37. The output of amplifier 36 is connected to a servomotor 38 which operates a pulley schematically indicated at 39 which is in turn suitably connected to a sled member 40 which is slidably mounted on cross arm 41 of the tracking table. A plotting pen 42 is connected to member 40 and moves therewith such that the momentary position of the target in the X direction is accurately indicated as member 40 is moved relative to cross arm 41 by motor 38. A slidable contact 43 is so connected as to be driven by motor 38 in synchronism with member 40. Contact 43 engages the resistance element 44 which is center grounded and is biased by means of two opposed symmetrically positioned batteries 45 and 46. A wire 47 connected to contact 43 provides a feedback path to amplifier 36 and it is apparent that the operation of motor 38 and consequently the position of member 40 will be controlled in accordance with the output signal of amplifier 20.

A servomotor 50 and a pulley 51 driven thereby serve to position cross arm 41 longitudinally of the tracking table 52 thereby indicating the Y position of the target. A contact 53 driven by motor 50 engages a center grounded resistor 54 which is biased by opposed symmetrically positioned batteries 55 and 56. A wire 57 connected to contact 53 provides a feedback path to amplifier 37, and it is apparent that the operation of motor 50 and consequently the position of member 41 will be controlled in accordance with the output signal of amplifier 37.

The tracking system as described is very useful for guidance of a guided missile from its launching position to a fixed target or known target area. However, if the target moves as in the case of an enemy aircraft, another system exactly identical with the one described may be employed such that two independent plotting pens plot the path of the missile and the target plane on the same tracking table. The missile may then be remotely controlled until the missile position coincides with that of the target.

It is evident, however, that even when two similar systems of the above described type are employed, the system is not fully automatic since it requires a human operator who manually directs the course of the missile to intersect that of the target. As pointed out previously, fully automatic systems which have been developed have proven unsatisfactory because of the excessive bulk, expense, complexity and unreliability.

Fig. 2 is an isometric view of the invention system wherein the position of the target and the missile are plotted in two directions only. The system comprises a table or support means 60 which has a track or slots 61 formed in the inner surfaces of opposite lateral portions thereof. Two cross arms 62 and 63 have the opposite ends thereof slidably positioned in tracks 61, each of the cross arms being positioned in the Y direction by an electromechanical system similar to that shown in Fig. 1.

A sled member 64 is slidably mounted on cross arm 63 and is positioned in the X direction by an electromechanical system similar to that shown in Fig. 1. A plotting pen 65 is connected to member 64 and is adapted to plot the course of the target on a suitable map or other recording means 66. It should be understood that one complete system as illustrated in Fig. 1 positions members 64 and 65 in accordance with the position of a selected target. An upstanding member 67 is fixed to member 64 and has an eyelet 68 formed therethrough whereby the eyelet simulates the position of the target.

A sled member 70 is slidably mounted on cross arm 62 and has a plotting pen 71 connected thereto which in turn engages member 66, thereby plotting the position of a missile or other pilotless vehicle. It should be understood that a second complete electromechanical system as shown in Fig. 1 is utilized to position members 70 and 71 in accordance with the position of an actual vehicle.

A frame means 72 is fixed to member 70 and has a high precision wire-wound resistor 73 extending between opposite lateral arms 74 and 75 thereof. A member 76 is slidably mounted between arms 77 and 78 of the frame and has connected thereto a contact 79 which engages resistor 73 thereby forming a potentiometer. This potentiometer is connected into a bridge circuit which is biased by a constant D. C. voltage produced by batteries 80. The output of the diagonal branch of the bridge circuit which appears across terminals 84 and 85 is fed into a conventional remote control system (not shown) which by means of radio signals actuates the autopilot of the missile so as to direct the missile to the correct flight path.

An elongated resilient course simulator means 90 is provided and is preferably in the form of a wire. Member 90 may be formed of steel or the like and should be sufficiently rigid such that it will not bend under its own weight, yet must be sufficiently resilient such that it may be deformed and bent between its various supported points. For example, member 90 may preferably have the approximate resilience and flexibility of conventional piano wire. It should be understood that elongated members other than wire may be utilized providing they have the desired qualities of resilience, flexibility and elasticity.

A clamping member 91 is secured to one end of a table 60 and one end of member 90 is clamped thereto by means of bolts 92. Member 90 is clamped in place such that the fixed end thereof is disposed at a point which represents the launching position of the missile. Member 90 passes through an eyelet 93 formed in member 76 and eyelet 68 formed in member 67. As eyelet 68 moves in accordance with and simulates the actual movements of the target, the course simulator 90 will automatically be deformed in the configuration of the optimum flight path from the launching position to the target which the missile should follow in order to strike the target.

As long as the missile is on the proper course, member 76 will be in center position relative to resistor 73 and the bridge circuit is in balance thereby producing no control signals across terminals 84 and 85. If, however, the missile deviates from the desired course, frame 72 moves with member 70 relative to member 76 and the bridge circuit becomes out of balance. A control signal of the proper polarity then appears across terminals 84 and 85 which directs the missile back toward the desired flight path. Member 90 has a sufficient longitudinal dimension such that it always passes through eyelet 68 of the target simulator thereby insuring that the vehicle simulator may proceed along member 90 until the missile strikes the target.

It should be noted that the guidance system as illustrated in Fig. 2 is adapted for use where guidance of the missile is required only in the X—Y directions and the missile need not be controlled in flight as to its elevation which would be the case in typical ground to ground, ship to ship, or ship to shore missile operation.

The conventional remote control system utilized with the invention system includes a radio transmitter which transmits the guidance signals appearing across terminals 84 and 85 to the vehicle where they are received by a small receiving set and transformed into suitable control voltages. These control voltages are fed into the autopilot of the vehicle and determine the position of the control surfaces thereof. The use of simple computers and time delay and damping networks to prevent the missile from weaving around its desired course is well known in prior art remote control systems.

It should be noted that the course simulator means of the present invention indicates the momentary optimum course from launching position to the target, but does not memorize the actual flight path with all its deviations from the desired course as is the case with electronic computers. Furthermore, the course simulator does not predict the future course of the missile according to its past history and present deviations, but only for its momentary position in flight. In other words, the system avoids unnecessary and superfluous storage of information and prediction of the future positions of the target and the missile.

It is essential that the accuracy of the system be extremely high and the first factor contributing to the accuracy of the system is the conventional tracking radar means which has been highly developed in the art. A second factor contributing to the accuracy of the system is the sensing means employed in conjunction with the vehicle simulator means, and therefore the sensing means must be quite sensitive to changes in the relative position of the vehicle simulator means and the course simulator means. The potentiometer sensing means shown in Fig. 2 has a limited degree of accuracy and a reluctance type sensing means as shown in Fig. 3 is considered preferable for the purpose of the invention wherein a scale factor may be on the order of 1:100,000.

Referring now to Fig. 3, there is shown a frame 100 in the form of an electromagnet corresponding to frame 72 shown in Fig. 2 and which supports two coils 101 and 102 having oppositely disposed pole pieces 103 and 104 respectively. The course simulator wire 105 which is shown in cross-section is disposed between the pole pieces, and upon relative movement of the sensing means with respect to the course simulator means, the impedance of the coils is changed. Each coil forms one branch of an A. C. bridge circuit, the other arms of which consist of a center-tapped winding 110 of transformer 106 the primary winding of which is connected to a constant voltage generator 107.

When member 105 is centrally disposed between pole pieces 103 and 104, no control signals appear in the diagonal branch of the bridge circuit across output terminals 108 and 109. As soon as the missile deviates from the desired course and the sensing means moves relative to the course simulator means, the bridge is then unbalanced and a control voltage is produced across terminals 108 and 109. The control voltage appears in the form of an A. C. voltage wherein right and left signals differ in phase, and as in the previous example, the control voltages may be suitably transmitted to the autopilot of the missile.

Since conventional remote control systems utilize D. C. signals of opposite polarity to direct the course of the missile, it is desirable that the A. C. signals produced in the control bridge circuit be converted into corresponding D. C. voltages. This result can be achieved by synchronous rectification in a circuit as shown in Fig. 4.

The sensing means of the circuit shown in Fig. 4 is identical with that shown in Fig. 3 and includes coils 101 and 102 having a course simulator means 105 disposed therebetween. As in the circuit as shown in Fig. 3, each of the coils form one branch of an A. C. bridge circuit the opposite branch of which consists of the center tapped secondary winding 115 of an input transformer 116, the primary winding 117 of which is connected to the constant voltage generator 118. The A. C. control signals across the diagonal branch of the bridge circuit are then converted into D. C. signals by means of the ring modulator 119 containing four rectifiers or diodes properly connected as shown. The ring modulator is terminated by two center tapped inductances or resistors 120 and 121, and the generator voltage is impressed upon their center points. The result is that D. C. signals are produced only from in phase components of those signals which are in phase or in phase-opposition with the generator voltage. Consequently, the phase relationship within the bridge rectifier determines the polarity of the control signals across the output terminals 122 and 123. Capacitor 124 connected across the output of the bridge circuit serves to filter fluctuations in the output voltage.

The circuit shown in Fig. 4 performs the same function as the circuit shown in Fig. 3, but the sensitivity and accuracy thereof is much greater. Consequently, when utilizing the circuit shown in Fig. 4 in conjunction with A. C. amplification, deviations of the course simulator wire from its center position in the order of microns will produce output signals of useful amplitude. It is evident that when utilizing a reluctance type pickup, the course simulator must be formed of a ferromagnetic material.

In order to properly guide the vehicle, it is desirable not only for the sensing means to sense lateral deviations of the vehicle simulator from the course simulator means, but also to sense the angular relationship between the frame of the vehicle simulator means and the course simulator means, this angular relationship being proportional to the angular derivative $dx/dy$. This information can be obtained with the use of complex electronix computers which derive such directional signals from the X—Y coordinates and their change with time. This problem may be solved quite simply in the present invention by measuring the yaw angle between the course simulator means and the frame of the vehicle simulator means.

The sensing means shown in Fig. 2 may be modified as shown in Fig. 5 wherein the eyelet 93 in member 76 is replaced by a small tube 130 through which the course simulator means 90 passes. The entire frame 72 is rotatably mounted upon support 131 which is fixed to sled member 70. Tube 130 will cause frame 72 to align itself perpendicularly to the direction of the course simulator means 90, and a contact member 132 which is fixed to frame 72 will rotate therewith.

Contact 132 engages a circular potentiometer 133 which forms one branch of a bridge circuit including batteries 134 and output terminals 135 and 136. When the course simulator means is perpendicular to cross arm 62, contact 132 engages resistor 133 at the same angular position as tap 137, and the bridge circuit is in balance whereby no control signals appear across terminals 135 and 136. Upon relative rotation of frame 72 with respect to cross arm 62 and sled 70, a control signal will appear across terminals 135 and 136 which in conjunction with the lateral signals from the linear potentiometer 73 are utilized to control the autopilot of the missile.

In order to obtain directional signals in a reluctance type pickup, the device shown in Figs. 3 and 4 may be modified as shown in Fig. 6. A double set of coils 140 and 141 are arranged a distance $\Delta Y$ apart and are secured to armature 100. The coils are connected as shown such that a first bridge circuit is formed including coils 140 and having output terminals 142 and 143 and a second bridge circuit is formed including coils 141 and having output terminals 142 and 144. Lateral deviations will cause an unbalance and consequent control voltage across terminals 142 and 143 and directional deviations of course simulator 105 with respect to armature 100 and cross arm 62 will cause an unbalance and consequent control signals across terminals 142 and 144. If it is desired to obtain D. C. signals, both bridges may be provided with a synchronous rectification arrangement as shown in Fig. 4.

The system as described up to this point only controls the ground course of the missile, but does not control the altitude thereof. The altitude of the missile in such case must be controlled manually according to indications of the altitude instrument 35 shown in Fig. 1 and a similar instrument indicating the altitude of the missile. A three-dimensional guidance system including an automatic control of the missiles' altitude in flight is obviously more accurate and desirable.

Fig. 7 illustrates somewhat schematically a fully automatic three-dimensional control system. The system is similar to that shown in Fig. 2 with the additional provision that the target simulator and the vehicle simulator are controlled in all three directions thereby also faithfully simulating changes in altitude of the target and the missile. The target simulator and the vehicle simulator are operated in a vertical direction in a manner similar to that in which they are operated in the two horizontal directions, employing an additional servomechanism as shown in Fig. 1. Since the construction of such a servo system is conventional, an additional showing in Fig. 7 is not believed necessary.

The sensing means of the vehicle simulator is modified to include four pairs of reluctance coils 150, 151, 152 and 153 all of which are suitably mounted in a frame member 155. Coils 150 and 151 are connected in a first control bridge circuit and coils 152 and 153 are connected in a second control bridge circuit, each of the bridge circuits being identical with those shown in Fig. 6. Coils 150 and 151 are horizontally disposed such that they respectively sense lateral deviations of the course simulator means with respect to the sensing means in the X direction and the yaw angle between the course simulator 105 and frame 155; and coils 152 and 153 are disposed in a vertical position such that they respectively sense deviations of the course simulator means with respect to the sensing means in the Z or vertical direction and the pitch angle between members 105 and 155. The output voltages of the control bridge circuits connected to coils 105—153 are utilized to control the autopilot of the missile as previously described. In order to eliminate interference and interaction between the bridge circuits, they are fed by different frequencies. Since the circuitry of the bridge circuit has been illustrated in Fig. 6, it is not considered necessary to show the connection of coils 150—153 in such bridge circuits in Fig. 7 since the circuits are identical with those shown in Fig. 6.

During operation of the invention system, it is evident that an unskilled operator may easily supervise the flight of the missile, and in an emergency may make corrections by bending the wire or displacing its clamping member even though it would not be possible for him to reduce the mathematical problems involved in such a short space of time.

It should be noted that the invention system may be utilized primarily as a course guidance system, directing the missile toward the vicinity of the target. The terminal phase of flight may be controlled by conventional active or passive homing systems such as sound homing or infra red homing and the like.

Although only a potentiometer and reluctance type sensing means have been disclosed, it is evident that other types of sensing means such as a photoelectric cell pickup and the like may be utilized to sense relative movement between the course simulator means and the sensing means.

It is apparent from the foregoing that there is provided a new and novel automatic control system for pilotless vehicles which eliminates the necessity of providing complicated computers or skilled operators and which automatically determines the optimum flight path of a missile in order to strike a target. The system is simple and inexpensive in construction, yet accurate and reliable in operation.

Obviously many modifications and variations of the present invention are possible in the light of the above teachings. It is therefore to be understood that within the scope of the appended claims the invention may be practiced otherwise than as specifically described.

I claim:

1. An automatic control system for pilotless vehicles which comprises a support means, target simulator means movably supported by said support means, means for positioning said target simulator means in accordance with the position of a selected target, vehicle simulator means movably supported by said support means and including a sensing means, means for positioning said vehicle simulator means in accordance with the position of a vehicle, and elongated resilient course simulator means having one end thereof fixed, said target simulator means engaging an intermediate portion of said course simulator means for deforming said last-mentioned means in accordance with movements of said target simulator means.

2. An automatic control system for pilotless vehicles which comprises a support means, target simulator means movably supported by said support means, means for positioning said target simulator means in accordance with the position of a selected target, vehicle simulator means movably supported by said support means, sensing means supported by said vehicle simulator means and including an electrical bridge circuit, means actuated by said bridge circuit for controlling the position of a pilotless vehicle, means for positioning said vehicle simulator means in accordance with the position of a vehicle, elongated resilient course simulator means having one end thereof fixed to a clamping means supported by said support means, and means connected to said target simulator means in engagement with an intermediate portion of said course simulator means for deforming said last-mentioned means in accordance with movements of said target simulator means.

3. A system as defined in claim 2 wherein an intermediate portion of said course simulator means is disposed adjacent to and in operative relationship to said sensing means such that said bridge circuit is energized in accordance with the relative position of said sensing means and said course simulator means.

4. An automatic control system for pilotless vehicles which comprises a support means having track means formed in opposite lateral portions thereof, a plurality of crossarms having the opposite ends thereof slidably mounted in said track means, target simulator means slidably mounted on one of said crossarms, means for positioning said target simulator means in accordance with the position of a selected target, clamping means supported by said support means, elongated resilient course simulator means having one end thereof fixed to said clamping means, means connected to said target simulator means engaging an intermediate portion of said course simulator means for deforming said course simulator means in accordance with movements of said target simulator means, vehicle simulator means slidably mounted on another of said crossarms, sensing means supported by said vehicle simulator means and substantially surrounding said course simulator means, an electrical bridge control circuit energized by said sensing means in accordance with the relative position of said sensng means and said course simulator means, and means for positioning said vehicle simulator means in accordance with the position of a vehicle.

5. An automatic control system for pilotless vehicles which comprises a support means, target simulator means movably supported by said support means, means for positioning said target simulator means in accordance with the position of a selected target, elongated resilient course simulator means having one end thereof fixed, said target simulator means engaging an intermediate portion of said course simulator means for deforming said course simulator means in accordance with movements of said target simulator means, vehicle simulator means movably supported by said support means and including a sensing means, said sensing means including a slidable member which is in engagement with an intermediate portion of said course simulator means, and means for positioning said vehicle simulator means in accordance with the position of a vehicle.

6. A system as defined in claim 5 wherein said sensing means includes a resistor means and said slidable member supports a contact means which is in engagement with said resistor means, said resistor means forming part of a bridge circuit for controlling the position of a vehicle.

7. A system as defined in claim 5 wherein said vehicle simulator means includes a movable crossarm and a sled means slidably mounted thereon, said sensing means being mounted in a frame which is rotatably mounted on said sled means and including a first and a second slide-wire potentiometer, said first slide-wire potentiometer having a contact member connected to a slidable member such that the first potentiometer is actuated upon relative movement between said slidable member and said frame, said second potentiometer having a contact member connected to said frame such that the second potentiometer is actuated upon rotation of said frame with respect to said sled member, a first bridge circuit being connected to said first potentiometer, and a second bridge circuit being connected to said second potentiometer.

8. An automatic control system for pilotless vehicles which comprises a support means, target simulator means movably supported by said support means, means for positioning said target simulator means in accordance with the position of a selected target, elongated resilient course simulator means having one end thereof fixed, said target simulator means engaging an intermediate portion of said course simulator means for deforming said course simulator means in accordance with movements of said target simulator means, vehicle simulator means movably supported by said support means and including a sensing means, said sensing means including a plurality of coils the pole pieces of which are in oppositely facing relationship to one another, each of said coils forming one branch of a bridge circuit, said course simulator means being disposed between said pole pieces, and means for positioning said vehicle simulator means in accordance with the position of a vehicle.

9. A system as defined in claim 8 wherein said sensing means includes two pairs of reluctance coils disposed in a horizontal plane, and two pairs of reluctance coils disposed in a vertical plane, each of said pairs of coils being inserted in a bridge circuit, said coils being positioned about and substantially surrounding said course simulator means.

References Cited in the file of this patent

UNITED STATES PATENTS

| | | |
|---|---|---|
| 1,707,274 | Morse | Apr. 2, 1929 |
| 2,532,402 | Herbold | Dec. 5, 1950 |